Jan. 10, 1956     L. G. HILKEMEIER     2,729,883
POSITIONER FOR WELDING OR OTHER MANUFACTURING OPERATION
Filed Feb. 25, 1953     2 Sheets-Sheet 1
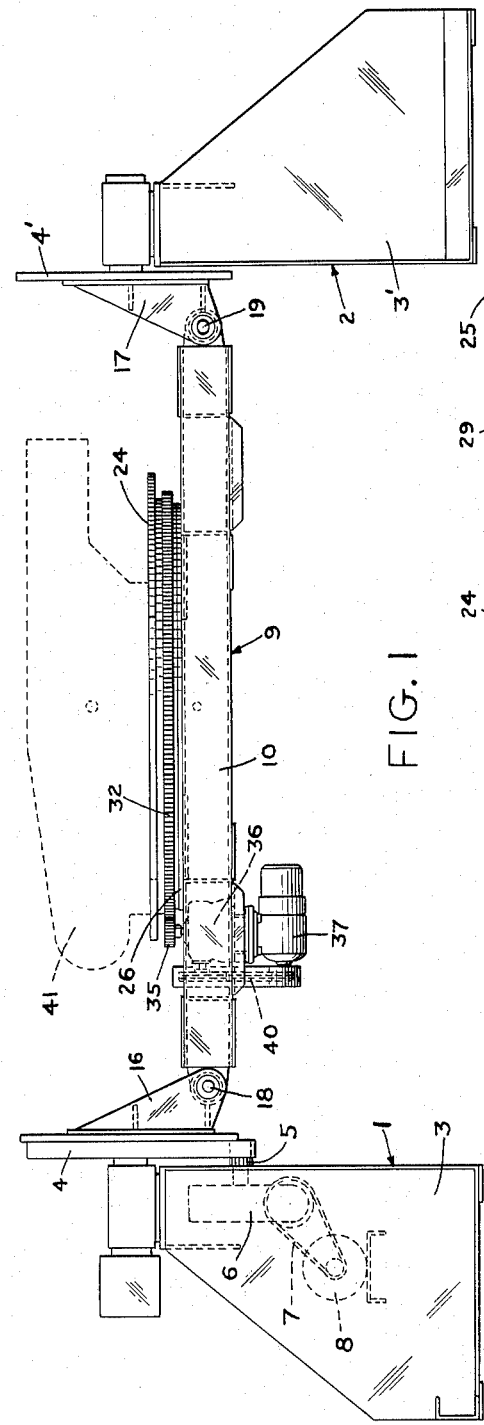
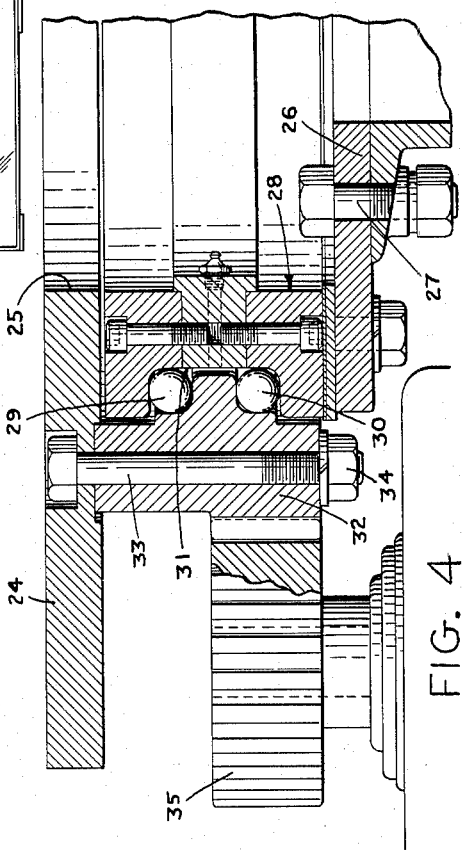
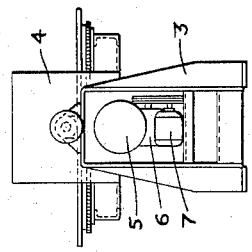
LOUIS G. HILKEMEIER
INVENTOR.
BY
ATTORNEY

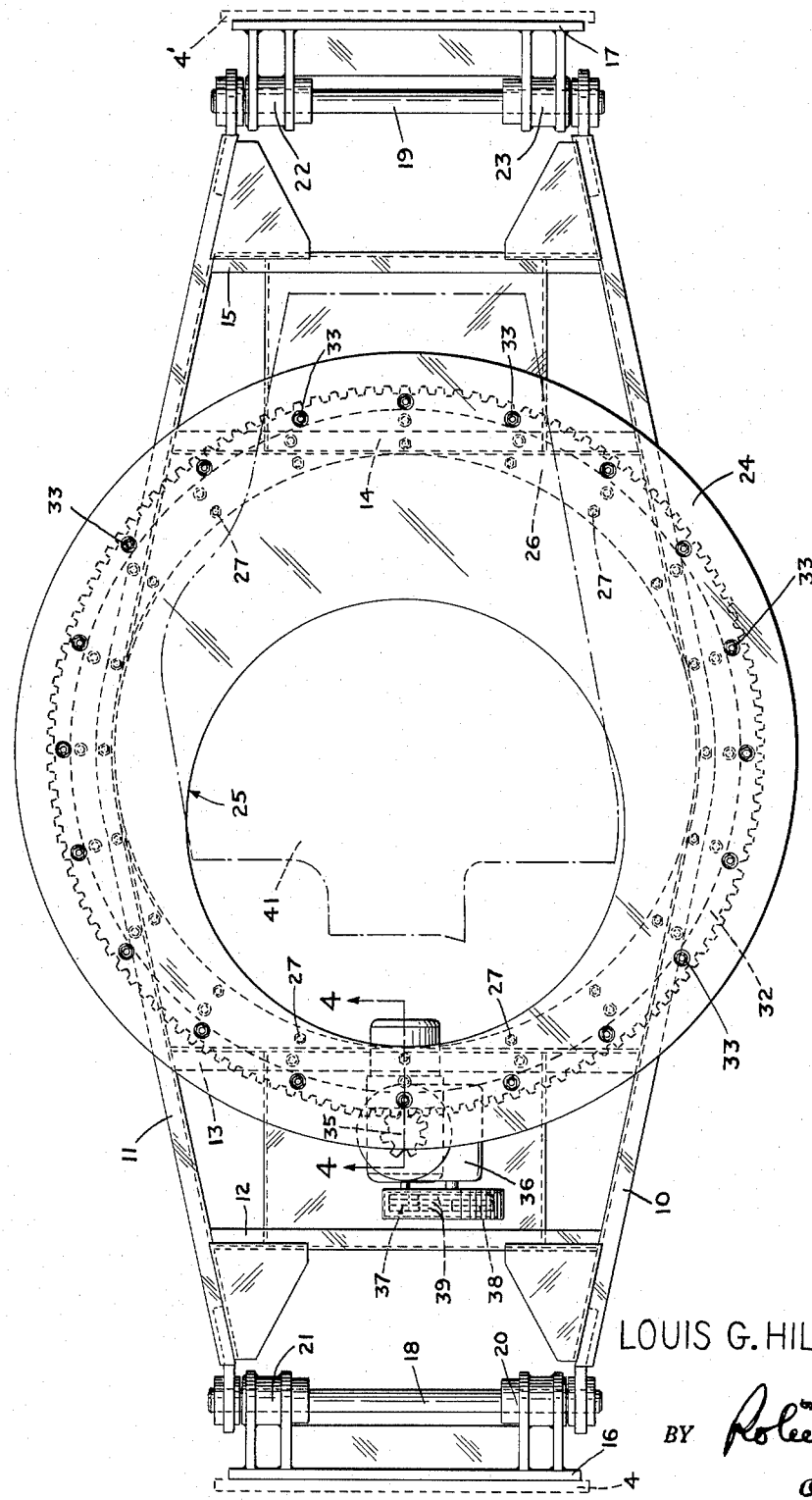

United States Patent Office
2,729,883
Patented Jan. 10, 1956

2,729,883

POSITIONER FOR WELDING OR OTHER MANUFACTURING OPERATION

Louis G. Hilkemeier, Plainfield, N. J., assignor to Worthington Corporation, Harrison, N. J., a corporation of Delaware Application February 25, 1953, Serial No. 338,662

2 Claims. (Cl. 29—288)

This invention relates to positioning equipment for holding and moving material to increase and facilitate the performance of welding, drilling, flame hardening, hard surface grinding and similar manufacturing operations.

It is well known that the handling of large pieces of equipment for the performance of various jobs therein creates a serious loss of man hours especially where there is inadequate crane service in a manufacturing plant. As a result positioning equipment for maneuvering equipment or raw material thereon has been developed to increase production; produce better and smoother jobs; save labor and crane service; reduce accident hazards, and decrease wastage.

The present invention covers a positioner having a power driven headstock and a tailstock assembly rotatably supporting a cradle assembly which has driven support means in the medial portion thereof for holding and maneuvering a piece of equipment or raw material attached thereto to enable the operator to perform the desired manufacturing task thereof.

Accordingly, it is an object of the present invention to provide a means for positioning equipment, raw material or the like and for moving the same either automatically or manually for any desired manufacturing operation thereon.

With this and other objects in view, as may appear from the accompanying specification, the invention consists of various features of construction and combination of parts, which will be first described in connection with the accompanying drawings, showing a positioner for welding or other manufacturing operation of a preferred form embodying the invention, and the features forming the invention will be specifically pointed out in the claims.

In the drawings:

Figure 1 is a side elevation showing the invention.

Figure 2 is an end view showing the invention from the power driven headstock end.

Figure 3 is a plan view of the invention.

Figure 4 is a cross-section taken on line 4—4 of Figure 3.

Referring to the drawings, Figure 1 shows a headstock 1 and tailstock 2 which are substantially identical in construction, are known in the art and are easily purchasable on the open market. They include bases 3 and 3' with support tables 4 and 4' rotatably mounted thereon for rotation about a horizontal axis. The tables 4 and 4' differ in that the table 4' on the tailstock 2 is freely rotatable while that on the headstock 1 is driven through a disconnect clutch and gear connection 5, and a variable or constant speed drive 6 in turn driven through pulley belts 7 connected about prime mover 8 of any suitable type. This disconnect clutch and gear connection 5 permits free hand rotation of the table 4 on the headstock and the table 4' of the tailstock when they are connected together by the cradle member generally designated 9 as hereinafter described.

*Cradle member*

The cradle member 9 includes channel beams 10 and 11 held in spaced relation by transverse members 12, 13, 14 and 15 so that the channel beams 10 and 11 are wider at the central portion than at the ends; and channel supports or brackets 16 and 17 fixedly connected and movable with said tables 4 and 4' respectively which support and are connected to the ends of said channel beams 10 and 11 by shafts 18 and 19 journalled in bearing pairs 20 and 21 and 22 and 23 on the respective channel supports or brackets 16 and 17, all of which is clearly shown in Figure 3 of the drawings.

Thus the tables 4 and 4', the cradle supports 18 and 19, and the channel beams 10 and 11 form a single rotatable unit when in assembled condition which may be manually rotated when the clutch and gear 5 is disengaged and automatically rotated when the clutch gear 5 is engaged.

*Rotatable work table*

A substantially circular work table 24 having an opening 25 formed therein eccentrically of the center is disposed for rotatory movement on said cradle 9 in an axis transversely of the axial line of movement of the tables 4 and 4' and cradle 9 in the assembled position. It will be understood that while the preferred form of invention shows the work table in movement about only a single axis, anyone skilled in the art could vary the axis of rotation without departing from the spirit of this invention.

Thus Figure 4 shows an annular support ring 26 connected by annularly spaced threaded member 27 to the channel members 10 and 11 and the transverse members 13 and 14. An inner annular ball bearing race member 28 is connected in any suitable manner to the support ring 26 so that upper and lower ball bearing members 29 and 30 mounted in a circumferential groove 31 about the outer periphery thereof are held therein by an externally toothed ring gear 32. The ring gear 32 is directly connected by annularly spaced bolts 33 and nuts 34 to the work table 24.

As is further shown in Figures 1, 3 and 4, the ring gear is engaged by a pinion 35 connected through a variable or constant speed gear box 36 to a prime mover 37 by means of pulleys 38 and 39 on the gear box and prime mover respectively and pulley belts 40. It will be understood that while this type of driving connection is shown that any suitable type of driving connection could be used without departing from the spirit of this invention.

*Operation*

When the cradle member 9 and the rotatable work table 24 thereon are in the position shown in Figure 1, an object, raw material or piece of equipment 41 may then be clamped by any suitable means (not shown) to the work table 24.

The table members 4 and 4' and the cradle 9 are now rotated by the driving means therefor to any desired position on the arc of movement.

The operator can now work on either the outside or the inside of the object or material by using a platform or standing and reaching therefor from the outside, or climbing on platform 41 and moving into the opening 25 to reach the inside thereof, where any desired manufacturing operation can be performed. The rotary control of the work table is set by a remote control (not shown) which connects to the prime mover 37.

While one form of the invention has been illustrated and described, it is obvious that those skilled in the art may vary the details of construction and it will be understood that the invention is therefore not to be limited to this specific construction or arrangement of parts shown but that they may be widely modified within the invention defined by the claims.

What is claimed is:

1. The combination with a headstock having a rotatable driven table thereon and a tailstock having a freely rotatable table of at least one cradle support bracket mounted on and movable with each of said tables, spaced channels connected between said cradle support brackets and movable therewith in a circular path about the axial line between said tables, said channels being wider at their central position than at their connecting end, a work table having an opening therethrough, means for movably mounting said work table on said widest portion of the spaced channels for rotatable movement about an axis transverse of the axial line of said tables including, a supporting ring fixedly connected to said channel members on the upper side thereof, a ball bearing member including an inner race fixedly connected to said supporting ring, a gear ring connected to said work table about said opening and forming an outer race to allow substantially frictionless rotation of said work table, and driving means engaging said gear ring for independent rotation of said work table, and a platform member attached to the underside of said channel members to facilitate operation through said opening.

2. The combination with a headstock having a rotatable driven table thereon and a tailstock having a freely rotatable table of at least one cradle support bracket mounted on and movable with each of said tables, spaced channels connected between said cradle support brackets and movable therewith in a circular path about the axial line between said tables, said channels being wider at their central position than at their connecting end, a work table having an opening therethrough eccentric of the center thereof, means for movably mounting said work table on said widest portion of the spaced channels for rotatable movement about an axis transverse of the axial line of said tables including, a supporting ring fixedly connected to said channel members on the upper side thereof, a ball bearing member including an inner race fixedly connected to said supporting ring, a gear ring connected to said work table about said opening and forming an outer race to provide substantially frictionless rotation of said work table, and driving means engaging said gear ring for independent rotation of said work table.

References Cited in the file of this patent

UNITED STATES PATENTS

| Number | Name | Date |
|---|---|---|
| 2,182,743 | Clergy | Dec. 5, 1939 |
| 2,311,668 | Kennedy | Feb. 23, 1943 |
| 2,348,062 | Faber | May 2, 1944 |
| 2,445,016 | Bentley | July 13, 1948 |
| 2,469,644 | Harrison | May 10, 1949 |
| 2,483,811 | Cullen | Oct. 4, 1949 |
| 2,495,250 | Gilly | Jan. 24, 1950 |
| 2,530,016 | Landis et al. | Nov. 14, 1950 |

FOREIGN PATENTS

| Number | Country | Date |
|---|---|---|
| 557,744 | Great Britain | Dec. 2, 1943 |
| 570,731 | Great Britain | July 19, 1945 |